United States Patent [19]

Magnus

[11] Patent Number: 4,946,717

[45] Date of Patent: Aug. 7, 1990

[54] WATER BASED PRECURE PAINT FOR RUBBER ARTICLES

[75] Inventor: Fredrick L. Magnus, Mogadore, Ohio

[73] Assignee: The Goodyear Tire & Rubber Company, Akron, Ohio

[21] Appl. No.: 837,999

[22] Filed: Mar. 10, 1986

[51] Int. Cl.$^5$ .......................... C08K 3/00; C08K 3/26; C08K 3/40; C08K 3/34

[52] U.S. Cl. .................. 427/393.5; 264/129; 524/424; 524/425; 524/426; 524/442; 524/444; 524/445; 524/456; 524/526; 524/555

[58] Field of Search .............. 264/129, 236; 524/424, 524/426, 442, 425, 444, 445, 446, 447, 526, 456, 555; 427/393.5

[56] References Cited

U.S. PATENT DOCUMENTS

| | | | |
|---|---|---|---|
| 3,472,803 | 10/1969 | Andrews et al. | 524/224 |
| 3,627,723 | 12/1971 | Kealy et al. | 524/224 |
| 3,658,769 | 4/1972 | Kline | 526/308 |
| 3,767,628 | 10/1973 | Kline | 526/305 |
| 4,020,039 | 4/1977 | Dunn et al. | 524/445 |
| 4,213,892 | 7/1980 | Scott | 525/350 |
| 4,253,994 | 3/1981 | Zakaria et al. | 524/526 |
| 4,452,939 | 6/1984 | Parker et al. | 524/551 |
| 4,481,337 | 11/1984 | Burlett et al. | 525/340 |
| 4,521,574 | 6/1985 | Patterson et al. | 526/204 |

FOREIGN PATENT DOCUMENTS

| | | | |
|---|---|---|---|
| 60-002 | 4/1985 | Japan | 524/426 |

*Primary Examiner*—Jan H. Silbaugh
*Assistant Examiner*—Mary L. Fertig
*Attorney, Agent, or Firm*—D. O. Nickey

[57] ABSTRACT

A water based coating composition for unvulcanized rubber articles that comprises (1) a polymeric antidegradant latex, (2) an additional emulsifier, (3) a thickening agent, and (4) a filler/mold release/lubricating agent. The water based coating composition is placed on an uncured rubber article prior to vulcanization and results in improved molding of the rubber article and provides a final rubber vulcanizate that possesses superior antidegradative properties.

4 Claims, No Drawings

WATER BASED PRECURE PAINT FOR RUBBER ARTICLES

TECHNICAL FIELD

This invention relates to a water based paint for uncured rubber articles. The paint is placed on the rubber article prior to vulcanization to promote efficient molding and to provide a surface veneer to the finished rubber article that resists degradation.

BACKGROUND ART

This invention is concerned with and relates to a water based precure paint that is useful on articles such as truck and passenger tires, off the road tires, hoses, belts and other articles that are molded during vulcanization and are exposed to oxidative environments. The precure paint (hereinafter PCP) of this invention facilitates rubber flow and air bleed during the early stages of cure (vulcanization) and further results in a final rubber article having as an integral part thereof an oxidatively resistant coating.

PCP's are applied to the sidewall areas of bias passenger, truck, earth mover and aircraft tires to reduce adhesion to the mold, improve air bleed and eliminate the flow crack problems during the early stages of cure. Until the last few years, most PCP's were solvent based rubber cements. Concern for safety and the environment has necessitated the conversion from solvent based to water based precure paints.

The industry's use of PCP's have been based on a number of requirements. Industry has demanded that PCP's (1) impart good lubricity between the rubber and the mold, (2) have good air bleed potential to minimize the number of defects due to trapped air, (3) have good mold release properties, (4) do not promote corrosion or fouling of the mold surface, (5) be resistant to both oxygen and ozone attack in the cured state, (6) exhibit good application, storing and handling characteristics, (7) neither contribute to flow cracking nor detract from the appearance of the tire, (8) be low in cost and (9) be nontoxic.

It is well known that rubber, both natural and synthetic, is susceptible to degradation by atmospheric oxygen and ozone. Over the years, numerous compounds have been developed that when combined with rubber will limit or lessen this degradation. Known antidegradants include the hindered phenols, the amines, UV stabilizers and other compounds known to the art. Most recently, a class of antidegradant known as polymeric or polymer bound antidegradants have been developed that are most interesting since, as part of the molecular structure of the rubber, they will not migrate or bleed from the rubber stock.

Tires, hoses, belts, conveyor belts and other articles that are constructed of vulcanized rubber are often subject to flexing, twisting or other manners of distortion during their useful lifetimes. Furthermore, such articles may be subjected to extreme climatic conditions and aging processes due to chemical reactions of the vulcanized rubber with the atmosphere. The problem of providing a precure coating material for vulcanizable rubber articles possessing good flexibility and age resistance has been a challenge to those persons working in the rubber industry for many years.

DISCLOSURE OF THE INVENTION

There is disclosed an improved water based precure paint that enhances the age resistance of cured rubber articles. The aqueous precure paint composition of this invention comprises:

(1) from 0 to 60 percent by weight of solids of the composition, of a rubber latex selected from the group consisting of styrene-butadiene rubber, polybutadiene, NBR, natural rubber or blends thereof;

(2) from 10 to 95 percent by weight of solids of the composition of a polymeric antidegradant said polymeric antidegradant comprising a polymer in latex form that contains as a segmeric unit thereof from 1 to 50 parts of a segmer that possesses antidegradative functionality:

(3) from 1.0 to 10 percent by weight of solids of the composition of additional anionic or nonionic emulsifier or blends thereof;

(4) from 0.1 to 20 percent by weight of solids of the composition of a thickening agent; and (5) from 1 to 60 percent by weight of solids of the composition of a filler/mold release/lubricating agent selected from the group consisting of silicon dioxide, carbon black, magnesium carbonate, magnesium silicate, aluminum silicate, glass spheres, silica, clay, or blends thereof.

There is also disclosed a method of manufacturing a vulcanized rubber article comprising the steps of:

(a) providing an article comprising at least one outer layer of a curable unvulcanized rubber:

(b) applying a coating between 0.001 and 0.1 cm thick of an aqueous precure paint to the surface of the curable unvulcanized rubber, said aqueous precure paint composition comprising:

(1) from 0 to 60 percent by weight of solids of the composition of a rubber in latex form selected from the group consisting of styrene-butadiene rubber, polybutadiene, NBR, natural rubber or blends thereof;

(2) from 10 to 95 percent by weight of solids of the composition of a polymeric antidegradant, said polymeric antidegradant comprising a polymer in latex form that contains as a segmeric unit thereof from 1 to 50 parts of a segmer that possesses antidegradative functionality:

(3) from 1 to 10 percent by weight of solids of the composition of additional anionic or nonionic emulsifier or blends thereof:

(4) from 0.1 to 20 percent by weight of solids of the composition of a thickening agent:

(5) from 1 to 60 percent by weight of solids of the composition of a filler/mold release/lubricating agent selected from the group consisting of silicon dioxide, carbon black, magnesium carbonate, magnesium silicate, aluminum silicate, glass spheres, silica, clay, or blends thereof; and (c) vulcanizing the so coated curable rubber article.

DETAILED DESCRIPTION OF THE INVENTION

The term "vulcanized" or "cured" as used herein means the introduction of a three dimensional crosslink structure between rubber molecules. Thus, the term "vulcanized rubber" as used herein means rubbers having the three dimensional crosslink structure between rubber molecules. In this case, the introduction of the crosslink structure may be performed by various crosslinking methods such as usual sulfur vulcanization, thiuram cure, peroxide vulcanization, and the like.

The term "rubber" as used herein means natural rubber and synthetic rubbers. Representative of the synthetic rubbers useful as the substrate in this invention are polyisoprene, polybutadiene, polychloroprene, styrene butadiene copolymers, isoprene butadiene copolymers, isobutylene isoprene copolymers, ethylene propylene diene terpolymers, halogenated isobutylene isoprene copolymers, acrylonitrile butadiene copolymers, and the like. The term rubber also includes a blend of natural rubber with one or more of the synthetic rubbers.

The rubber of the article to be coated with the PCP may be compounded with a filler such as carbon black, silica, calcium carbonate, titanium dioxide, or the like. Also, a softening agent such as mineral oil, vegetable oil, synthetic plasticizers, or the like may be present. In addition, usual compounding ingredients, such as cure packages, usually used for the preparation of vulcanized rubber are contemplated herein.

The rubber latex that may be used in formulating the PCP of this invention may be natural, synthetic or blends thereof. The amount added is based on weight of solids of the latex. The rubber latex includes those compounds, such as, surfactants and emulsifiers, that are usually associated with rubber latices.

A filler may be used in formulating the precure paint of this invention. Representative of the fillers that may be used include silicon dioxide, carbon black in its various forms, magnesium carbonate, magnesium silicate, aluminum silicate, glass spheres, silica, clay, china clay, and the like.

The term "polymeric antidegradant latex" as used herein refers to a class of latices that contains as part of the polymer, a segmer that possesses antidegradative functionality. These polymeric antidegradants are known in the art and are described in greater detail in U.S. Pat. Nos. 4,452,939; 4,521,574; 3,658,769; 3,767,628; 4,213,892; and 4,481,337 which are herein incorporated by reference. The antidegradant segmer present in the polymer can be derived from the polymerization of diene and/or vinyl monomers with monomers that possess an antidegradative functionality. Representative of the monomers that possess an antidegradative functionality are compounds with the structural formula:

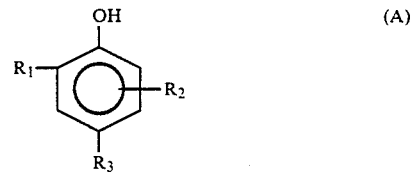

wherein $R_1$ and $R_2$ are tert-alkyl radicals from 4 to 8 carbon atoms, $R_3$ is selected from the group of radicals:

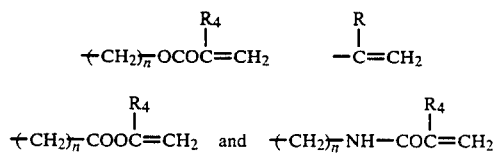

wherein $R_4$ is hydrogen or methyl and n is 0 to 3; and compounds such as:

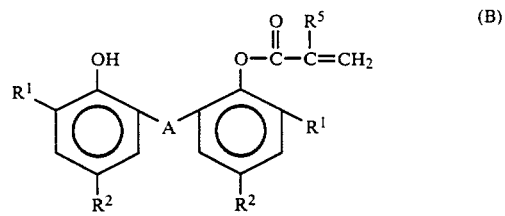

wherein $R^1$ and $R^2$ are selected from n-alkyl radicals from 1-18 carbons and secondary alkyl radicals from 3-18 carbon atoms, and t-alkyl radicals from 4-8 carbon atoms; $R^5$ is H, $CH_3$ or $C_2H_5$ and A is selected from the radicals:

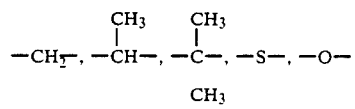

Other monomers possessing an antidegradative functionality include compounds such as:

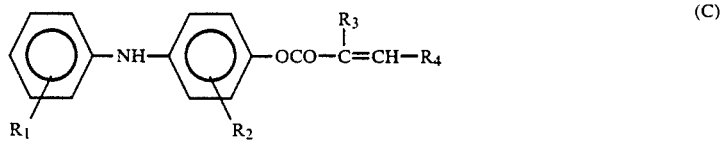

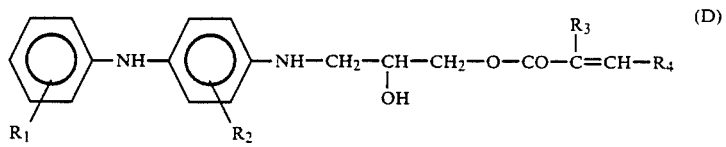

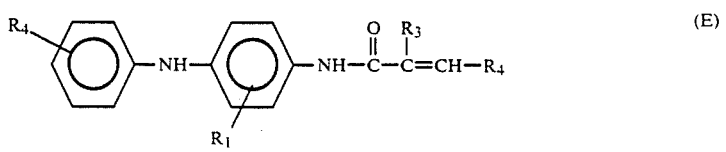

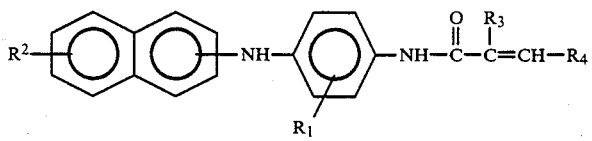
(F)

where each of $R_1$ and $R_2$ are alkyl radicals of 1 to 4 carbon atoms, $R_3$ is hydrogen or methyl and $R_4$ is H or phenyl.

In addition the polymeric antidegradant latex may be prepared according to a procedure known in the art as "grafting." One form of grafting is the reaction of a halomethylated polymer with a compound that contains the antidegradative functionality. The attachment of the antidegradant moiety or functionality to the polymer may be accomplished through the use of free radicals or phase transfer catalysis in the latex form.

Grafting may also be accomplished on solid rubber through mixing or milling the rubber with a compound that possesses the antidegradative functionality. Molecules or compounds that may be grafted onto the polymer which possess antidegradant properties include but are not limited to those antidegradants of the amine and the hindered phenolic classes. These known antidegradants are generally known by the term chain-breaking antioxidants, however, other antioxidants commonly known as peroxide-decomposing antioxidants, ultraviolet screening agents, triplet quenchers and metal deactivators are contemplated herein. Some examples of chain-breaking antioxidants that may be grafted are represented by the following formulas:

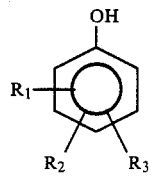

wherein $R_1$ and $R_2$ are the same or different radicals selected from the group consisting of hydrogen, alkyl, cycloalkyl, aralkyl or aryl and wherein $R_3$ is selected from:

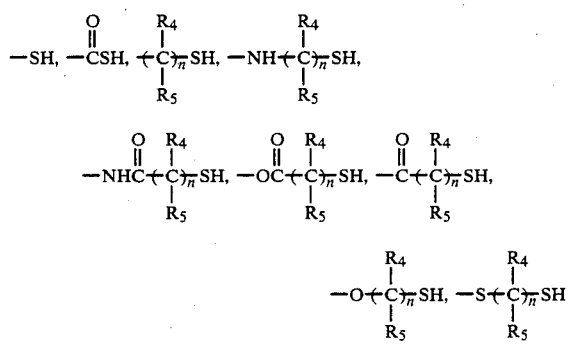

wherein n equals 1-12, $R_4$ and $R_5$ are the same or different radicals selected from hydrogen and hydrocarbon radicals having from 1 to 20 carbon atoms.

Other compounds useful in preparing the polymeric antidegradant latex via grafting are compounds such as:

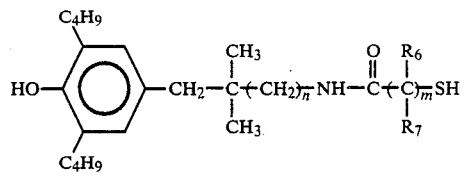

wherein n equals 0 to 1, m is 1 or 2 and $R_6$ and $R_7$ are the same or different radicals selected from the group consisting of hydrogen and radicals having 1 to 10 carbon atoms; and compounds such as:

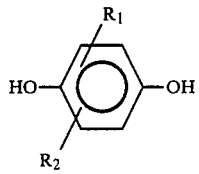

wherein $R_1$ and $R_2$ are the same or different radicals selected from the group comprising hydrogen and hydrocarbon radicals having 1 to 18 carbon atoms; and compounds such as

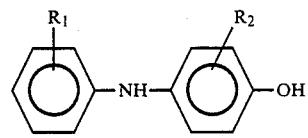

wherein $R_1$ and $R_2$ are the same or different radicals selected from the group comprising hydrogen and hydrocarbon radicals having 1 to 18 carbon atoms.

The polymeric antidegradant latex used in this invention, irrespective of its method of preparation, should contain from 1 to 50 segmers of the antidegradant moiety per 100 segmers of polymer. It should be appreciated that these antidegradant latices will also include the usual components found in a latex.

The additional emulsifier over and above that found in the latices, used in the PCP of this invention may be of the anionic or non-ionic type or blends thereof. Representative of the emulsifiers that are useful in this invention are the polyalkylene glycol ethers, alkyl polyoxyalkylene glycol esters, sodium dioctyl sulfosuccinate, and acetylenic glycol.

The amount of the emulsifier added to the PCP of this invention, in addition to the emulsifiers already present in the latices is sufficient to achieve a surface tension of preferably about 30 dynes/cm. The surface tension of the final PCP composition can range from 20 to 40 dynes/cm. The surface tension of the final PCP should be such that the unvulcanized rubber article will be easily and evenly coated. Surface tension as related herein was determined using a DuNouy tensiometer using the method set out in ASTM D1417.

The thickening agents useful in the PCP of this invention are the modified polysaccharides, polyethylene oxides, hydroxyethyl celluloses and the acrylic acid polymers.

The PCP composition may optionally contain from 0-60 percent by weight of solids of the composition of a rubber latex. The use and type of latex will be dictated by the substrate to be coated. One skilled in this art will appreciate that compatibility of the PCP to the substrate can be modified through selection of the proper amount and type of latex added to the PCP composition.

The precure paint of this invention is utilitarian because it satisfies all the requirements of a precure paint and further adds the beneficial property to the final vulcanizate of being resistant to degradation.

The following examples illustrate embodiments of the new precure paint:

EXAMPLE 1

A rubber compound onto which the precure paint of the instant invention was applied consisted of the components set out in Table I.

TABLE I

| Components | Parts by Wt. |
| --- | --- |
| Natural Rubber | 40.00 |
| Polybutadiene | 60.00 |
| Carbon Black | 50.00 |
| Processing Oil | 10.00 |
| Waxes | 1.00 |
| Tackifier | 5.00 |
| Antioxidant (phenolic) | 1.25 |
| Antidegradant (phenolic amine) | 4.00 |
| Stearic Acid | 1.00 |
| Zinc Oxide | 3.50 |
| Sulfur | 2.25 |
| Accelerator | 0.50 |

The components listed in Table I were processed in conformity with usual practices accepted in the industry. Table II sets forth the formulation for the precure paint used in this example.

TABLE II

| Component | Parts by Weight of Total Composition |
| --- | --- |
| Water | 32.68 |
| Magnesium Silicate | 14.07 |
| Thickener (modified polysaccharide) | 0.35 |
| Nonionic Emulsifier (alkyl polyoxyalkylene glycol ester) | 0.66 |
| Anionic Emulsifier (sodium dioctyl sulfosuccinate) | 0.66 |
| Carbon Black (colloid dispersion of 42% solids) | 18.51 |
| Polymeric Antidegradant | 34.10 |

The polymeric antidegradant latex was obtained from the aqueous emulsion polymerization of 65 parts of butadiene and 35 parts of N-(4-anilinophenyl) methacrylamide prepared according to U.S. Pat. No. 4,521,574.

It should be noted that the PCP of this invention does not contain a cure package or vulcanization system. The PCP relies on residual sulfur and accelerators from the rubber substrate to provide the components necessary for vulcanization of the PCP.

The components of the PCP may be added and mixed in any order; however, it is preferable to add the polymeric antidegradant and rubber latex last and then finally adjust the surface tension through addition of extra surfactant. The PCP may be applied to the uncured rubber substrate (Table I) in any manner known so that a uniform coating from 0.02 to 1.0 mm thick is achieved. The PCP may be brushed on but is preferably applied through the use of a spray gun. In this example a sheet of rubber (Table I) approximately 15 cm $\times$ 15 cm had applied to it via a spray gun, 1.5 gm of the PCP of Table II. The thus coated rubber was then cured at 150° C. for 20 minutes under a pressure of 68.95 MPa. (10,000 psi).

The ability of the precure paint of this invention to impart resistance of the final rubber vulcanizate to environmental degradation was demonstrated by placing a vulcanized rubber article having the PCP of this invention applied thereto and a control (no PCP) in an ozone test chamber. The samples were extended 25% and placed in the ozone chamber which contained 50 parts per hundred million of $O_3$ at 38° C. After 96 hours in the ozone chamber the control had heavy cracking and failed upon flexing while the article coated with the PCP of this invention showed very little cracking and did not fail after 96 hours in the ozone chamber.

A dynamic ozone test was also conducted wherein the specimen to be tested is extended 25% and then relaxed according to ASTM #D3395. As noted above, a vulcanized article having the PCP applied thereto was compared to a control. After 48 hours at 40° C. and 50 parts per hundred million ozone the article having the PCP of this invention showed little cracking compared to the control. This is evidence that the PCP of this invention possesses the required flexibility to insure good protection of the substrate from degradation during dynamic use of the rubber article.

The precure paint of this invention provides a non-solvent type of precure paint that promotes the efficient vulcanization of the rubber article in a mold and further imparts an oxidatively resistant veneer to the finished rubber article. The precure paint of this invention has excellent shelf stability and produces no harmful solvent vapor. Further, the precure paint of this invention provides a coating which has no detrimental influence on the properties of the vulcanized rubber such as flex, fatigue, and the like.

It will be apparent the changes and modifications may be made in the invention by those skilled in the art without deviating from the scope of the invention.

What is claimed is:

1. A composition for the coating of an unvulcanized rubber article, said composition comprising:
  (1) from 0 to 60 percent by weight of solids of the composition, of a rubber latex selected from the group consisting of styrene-butadiene rubber, polybutadiene, NBR, natural rubber or blends thereof;
  (2) from 10 to 95 percent by weight of solids of the composition of a polymeric antidegradant, said polymeric antidegradant comprising a polymer in latex form that contains as a segmeric unit thereof from 1 to 50 segmers that possess antidegradative functionality per 100 segmers;
  (3) from 1 to 10 percent by weight of solids of the composition of additional anionic or nonionic emulsifier or blends thereof;
  (4) from 0.1 to 20 percent by weight of solids of the composition of a thickening agent; and
  (5) from 1 to 60 percent by weight of solids of the composition of a filler/mold release/lubricating agent selected from the group consisting of silicon dioxide, carbon black, magnesium carbonate, magnesium silicate, aluminum silicate, glass spheres, silica, calcium carbonate, clay, or blends thereof.

2. The composition according to claim 1 wherein the polymeric antidegradant latex comprises a copolymer of butadiene and N-(4-anilinophenyl) methacrylamide.

3. A process for the manufacture of a vulcanized rubber article comprising the steps of:
   (a) providing an article comprising at least one outer layer of an unvulcanized rubber:
   (b) applying a coating between 0.001 and 0.1 cm thick of an aqueous precure paint to the surface of the unvulcanized rubber, said aqueous precure paint comprising:
   (1) from 0 to 60 percent by weight of solids of the composition of a rubber latex selected from the group consisting of styrene-butadiene rubber, polybutadiene, NBR, natural rubber or blends thereof;
   (2) from 10 to 95 percent by weight of solids of the composition of a polymeric antidegradant, said polymeric antidegradant comprising a polymer in latex form that contains as a segmeric unit thereof from 1 to 50 segmers that possesses antidegradative functionality per 100 segmers;
   (3) from 1 to 10 percent by weight of solids of the composition of additional anionic or nonionic emulsifier or blends thereof;
   (4) from 0.1 to 20 percent by weight of solids of the composition of a thickening agent;
   (5) from 1 to 60 percent by weight of solids of the composition of a filler/mold release/lubricating agent selected from the group consisting of silicon dioxide, carbon black, magnesium carbonate, magnesium silicate, aluminum silicate, glass spheres, silica, clay, or blends thereof; and
   (c) vulcanizing the so coated curable rubber article.

4. A process according to claim 3 wherein the polymeric antidegradant latex comprises a copolymer of butadiene and N-(4-anilinophenyl) methacrylamide.

* * * * *